US012663556B2

(12) United States Patent
Al Readean

(10) Patent No.: US 12,663,556 B2
(45) Date of Patent: Jun. 23, 2026

(54) PREDICTING FORMATION FRACKABILITY USING SURFACE LOGGING DATA

(71) Applicant: Saudi Arabian Oil Company, Dhahran (SA)

(72) Inventor: Muhammad S. Al Readean, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 273 days.

(21) Appl. No.: 18/116,639

(22) Filed: Mar. 2, 2023

(65) Prior Publication Data

US 2024/0295668 A1  Sep. 5, 2024

(51) Int. Cl.
G01V 1/50 (2006.01)
G01V 1/46 (2006.01)

(52) U.S. Cl.
CPC .................. G01V 1/50 (2013.01); G01V 1/46 (2013.01); *G01V 2200/14* (2013.01)

(58) Field of Classification Search
CPC ......... G01V 1/50; G01V 1/46; G01V 2200/14
See application file for complete search history.

(56) References Cited

U.S. PATENT DOCUMENTS

| | | | |
|---|---|---|---|
| 10,920,552 B2 | 2/2021 | Rodriguez-Herrera et al. | |
| 12,032,539 B2 * | 7/2024 | Zeghlache | G06F 16/25 |
| 2009/0319243 A1 * | 12/2009 | Suarez-Rivera | G01V 1/50 |
| | | | 702/11 |

| | | | |
|---|---|---|---|
| 2017/0235016 A1 * | 8/2017 | Prioul | G01N 29/04 |
| | | | 73/152.01 |
| 2017/0322337 A1 * | 11/2017 | Prasad | G01R 33/50 |
| 2018/0016895 A1 * | 1/2018 | Weng | G01V 1/306 |
| 2020/0183047 A1 * | 6/2020 | Denli | G01V 20/00 |

(Continued)

FOREIGN PATENT DOCUMENTS

| | | | | |
|---|---|---|---|---|
| CA | 2743611 | 3/2017 | | |
| CN | 113158792 A | * 7/2021 | ........... | G06F 18/214 |
| CN | 115056829 A | * 9/2022 | ............... | G06N 3/08 |

OTHER PUBLICATIONS

Sondergeld, Carl H. "Application of Interpretable Machine-Learning Workflows To Identify Brittle, Fracturable, and Producible Rock in Horizontal Wells Using Surface Drilling Data." (2020) (Year: 2020).*

(Continued)

*Primary Examiner* — Douglas Kay

(74) *Attorney, Agent, or Firm* — Fish & Richardson P.C.

(57) ABSTRACT

Systems and methods include a computer-implemented method for determining frackability probabilities. Surface logging data of a well being drilled for fracking is accessed. Quality control (QC) and quality assurance (QA) are performed on the surface logging data. Drift analysis is performed on the surface logging data. The surface logging data is prepared for predictive model processing. A predictive model is executed using the prepared surface logging data. A visualization is generated based on executing the predictive model, including information provided for different drilling depths. Fracking intervals are interactively determined using user inputs in the visualization. Frackability probabilities are determined for the fracking intervals and updating the visualization to include a visualization of the fracking intervals.

20 Claims, 4 Drawing Sheets

(56)  References Cited

U.S. PATENT DOCUMENTS

| 2021/0110280 | A1* | 4/2021 | Akkurt ..................... G01V 5/12 |
| 2021/0255119 | A1 | 8/2021 | Nikitin et al. |
| 2022/0106866 | A1 | 4/2022 | Wang et al. |
| 2022/0365913 | A1* | 11/2022 | Zeghlache ............... G01V 1/40 |
| 2023/0177346 | A1* | 6/2023 | Merrill ................... G06N 3/088 |
| | | | 706/25 |
| 2024/0018854 | A1* | 1/2024 | Chhatre ................ E21B 43/122 |
| 2024/0018856 | A1* | 1/2024 | Chhatre ................ E21B 43/168 |
| 2024/0027643 | A1* | 1/2024 | Yan .................... G01N 33/2823 |
| 2024/0378457 | A1* | 11/2024 | Satheesh Kumar ... G06N 3/098 |

OTHER PUBLICATIONS

Alzahabi, A., and et al. "Horizontal completion fracturing techniques using data analytics: selection and prediction." In ARMA US Rock Mechanics/Geomechanics Symposium, pp. ARMA-2017. ARMA, 2017 (Year: 2017).*

* cited by examiner

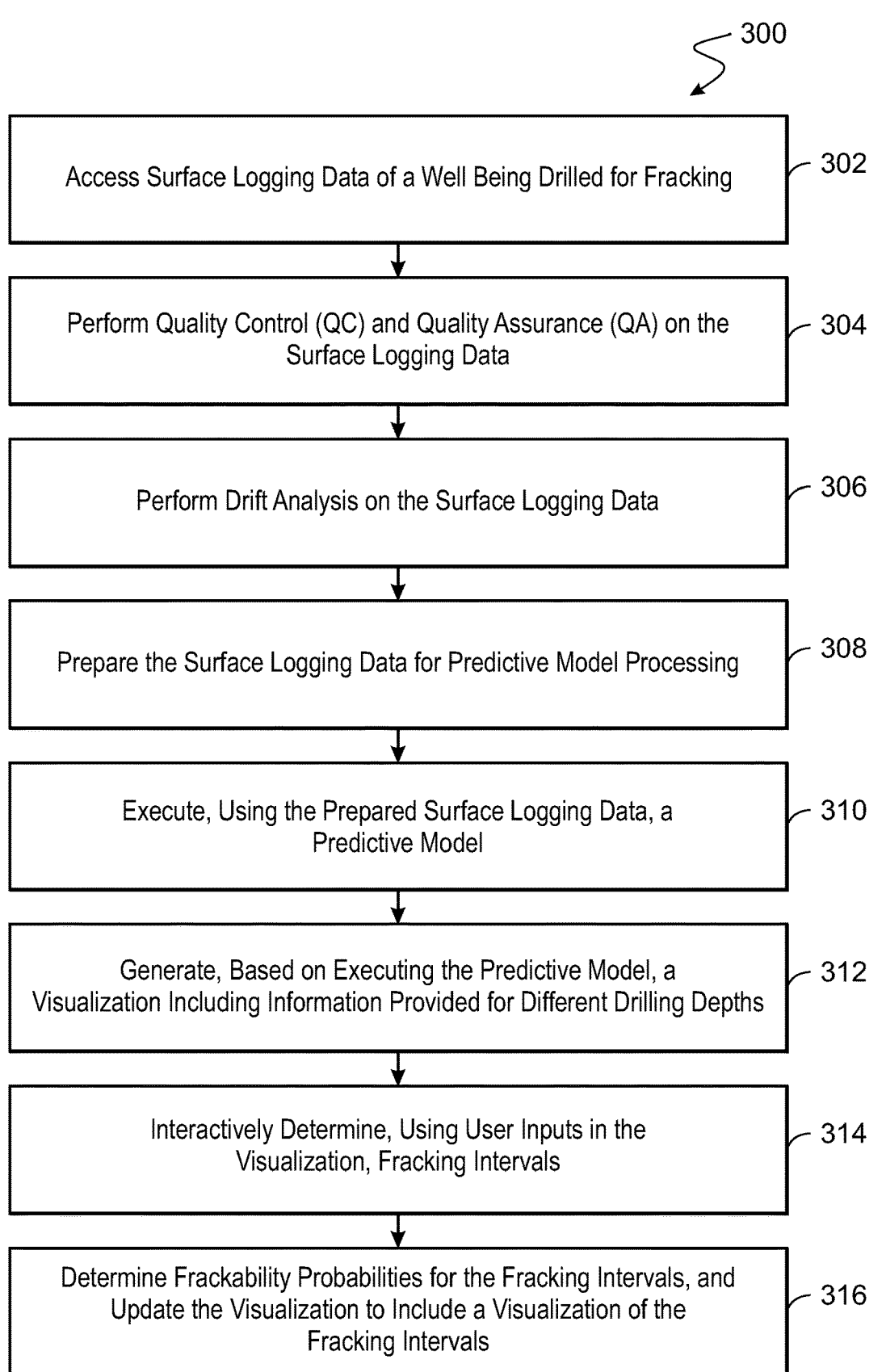

300

Access Surface Logging Data of a Well Being Drilled for Fracking — 302

Perform Quality Control (QC) and Quality Assurance (QA) on the Surface Logging Data — 304

Perform Drift Analysis on the Surface Logging Data — 306

Prepare the Surface Logging Data for Predictive Model Processing — 308

Execute, Using the Prepared Surface Logging Data, a Predictive Model — 310

Generate, Based on Executing the Predictive Model, a Visualization Including Information Provided for Different Drilling Depths — 312

Interactively Determine, Using User Inputs in the Visualization, Fracking Intervals — 314

Determine Frackability Probabilities for the Fracking Intervals, and Update the Visualization to Include a Visualization of the Fracking Intervals — 316

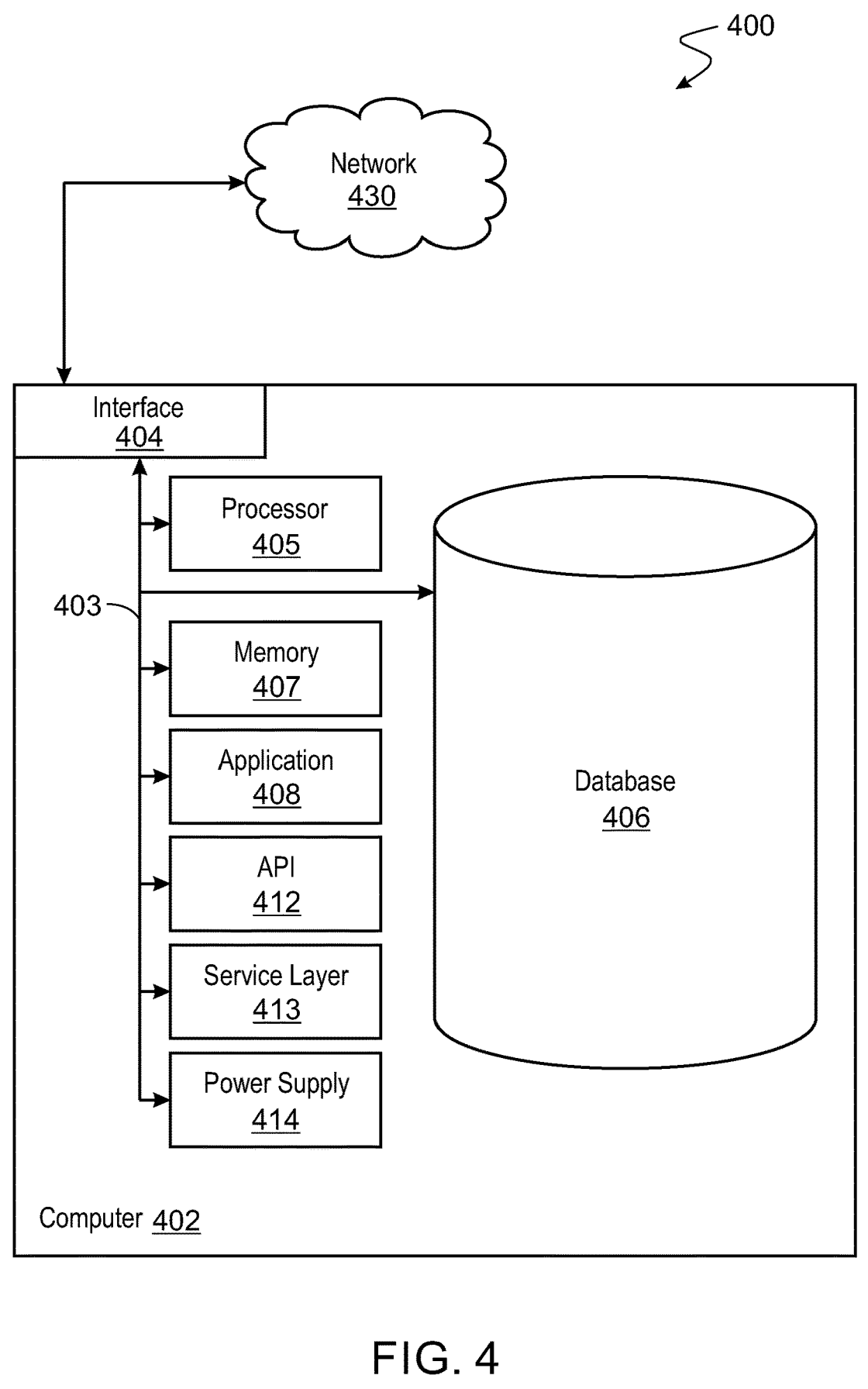

Network
430

Interface
404

403

Processor
405

Memory
407

Application
408

API
412

Service Layer
413

Power Supply
414

Database
406

Computer 402

FIG. 4

PREDICTING FORMATION FRACKABILITY USING SURFACE LOGGING DATA

TECHNICAL FIELD

The present disclosure applies to determining frackability, e.g., for a well.

BACKGROUND

Hydraulic fracturing planning is a tedious task that requires careful engineering analysis of well log data that comes usually from logging-while-drilling (LWD) operations during well drilling and from wireline logging jobs. In this engineering analysis, well logs provide indirect petrophysical measurements of formation porosity, fluid saturation, overburden pressure and generally formation geomechanical properties. Geomechanical properties drive the ability to initiate and maintain hydraulic fractures. On the other hand, the interaction between the bit and penetrated formations can be characterized by the same geomechanical properties. This suggests that surface drilling parameters, measured by default during the well drilling, can be used to evaluate the formation frackability, as well as the ability to induce formation fractures. Although geomechanical properties are critical for fracturing job planning, geomechanical properties don't convey any information about formation fluids.

Integrating mud logging data with drilling parameters, both are known as surface logging data, provides an alternative path to plan fracking jobs. The novelty of using surface logging data to determine targeted fracking intervals can be leveraged with the use of artificial intelligence that provides a predictive model that can predict formation frackability in real-time. In addition to delivering instantons decisions, the whole process is automated facilitating stimulation planning while drilling (SWD).

SUMMARY

The present disclosure describes techniques that can be used for predicting formation frackability in real-time. The techniques can also cover situations that are not real-time . . . . The term real-time can correspond, for example, to events that occur within a specified period of time, such as within one minute. In some implementations, a computer-implemented method includes the following. Surface logging data of a well being drilled for fracking is accessed. Quality control (QC) and quality assurance (QA) are performed on the surface logging data. Drift analysis is performed on the surface logging data. The surface logging data is prepared for predictive model processing. A predictive model is executed using the prepared surface logging data. A visualization is generated based on executing the predictive model, including information provided for different drilling depths. Fracking intervals are interactively determined using user inputs in the visualization. Frackability probabilities are determined for the fracking intervals and updating the visualization to include a visualization of the fracking intervals.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. A real-time decision-making tool can be used for well stimulation using hydraulic fracturing. Engineers can be provided with predictive insights about formation frackability. The dependency on the well log data can be reduced. Decision delays can be eliminated. An alternative way to predict formation frackability can be used that provides improvements and more timely results than techniques (e.g., using well logs) commonly used in the industry. The whole process can be automated. The utilization of surface logging data can minimize the dependency and additional cost associated with using well log data.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIG. 3 is a flowchart of an example of a method for determining frackability probabilities, according to some implementations of the present disclosure.

FIG. 4 is a block diagram illustrating an example computer system used to provide computational functionalities associated with described algorithms, methods, functions, processes, flows, and procedures as described in the present disclosure, according to some implementations of the present disclosure.

Like reference numbers and designations in the various drawings indicate like elements.

DETAILED DESCRIPTION

The following detailed description describes techniques for predicting formation frackability in real-time. For example, surface logging data can be used to determine targeted fracking intervals. This can be done by also using artificial intelligence in providing and executing a predictive model to predict frackability. Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Figure 1:
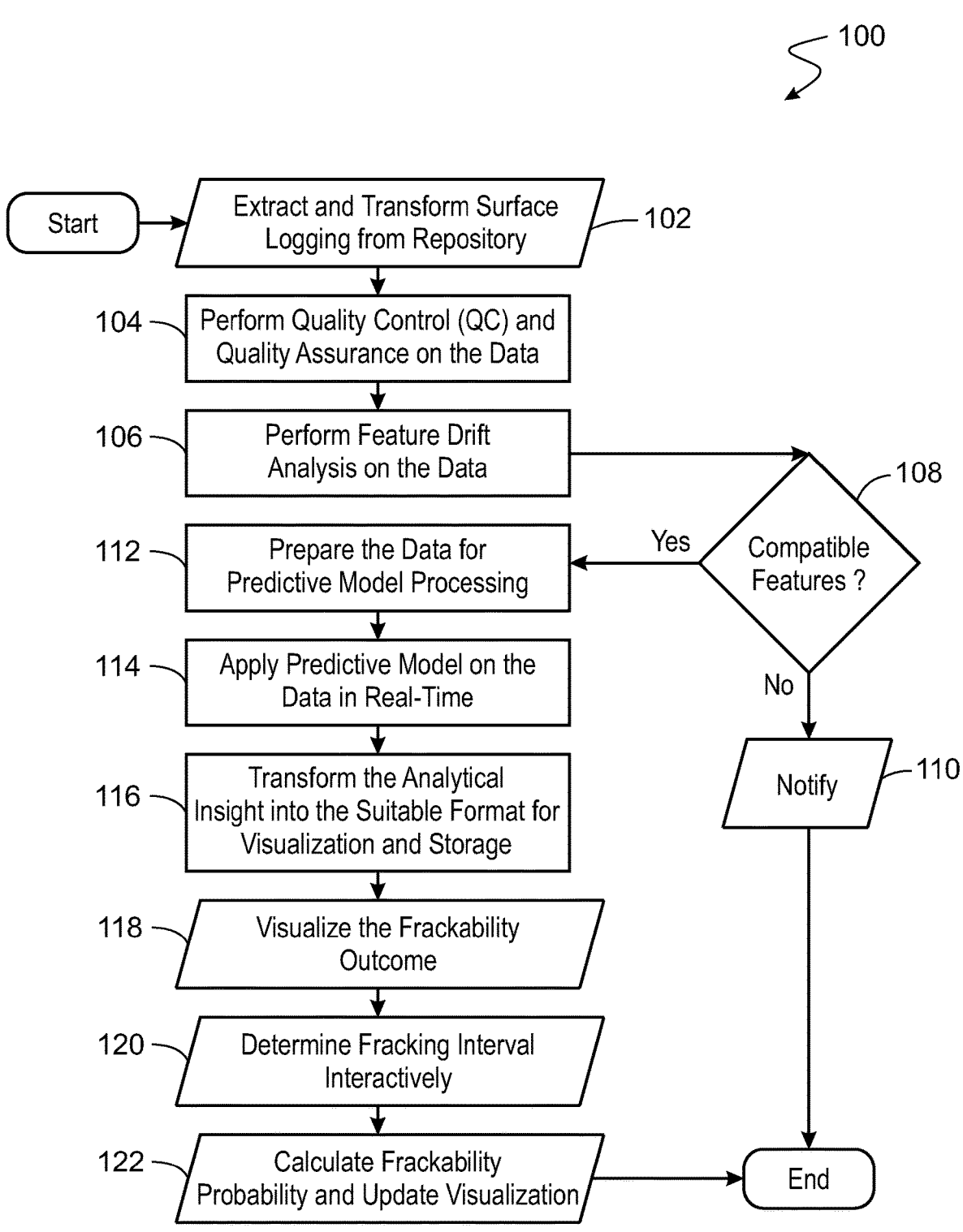
FIG. 1 is a flow diagram showing an example of a workflow for predicting well frackability, according to some implementations of the present disclosure.

FIG. 1 is a flow diagram showing an example of a workflow 100 for predicting well frackability, according to some implementations of the present disclosure.

At 102, surface logging data is extracted and transformed. Surface logging data can include drilling parameters and mud log lithology and chromatography gas analysis data extracted from the data source. Surface logging data is extracted and transformed can be achieved in real-time. The extracted data may have different formats such as Wellsite Information Transfer Standard Markup Language (WITSML) or CSV which requires data transformation into a tabular format to be ready for subsequent steps. Table 1 lists examples of surface logging data.

TABLE 1

| Examples of Surface Logging Data | | |
| --- | --- | --- |
| Weight-On-Bit (WOB) | Hook Load | Rate of Penetration (ROP) |
| Hydrocarbon Quantity $C_x$ where x = {1, 2, 3, 4, . . .} | Revolutions Per Minute (RPMs) | Flow In |
| Flow Out Rate | Bit Size (BS) | Lithology Volumes |

Data Quality Check

At 104, quality control (QC) and quality assurance (QA) checks are performed on the data. The data can be organized as a table, known as data frame in the computational world, which consists of a set of rows and columns. The rows can represent the data observations per depth point, while the columns can show the input features (e.g., associated with drilling parameters and mud logs). The data quality is checked row-by-row and column-by-column, filtering out rows with missing and inconsistent values. In addition, data has been profiled against measured depth to show missing values.

Feature Drift Analysis

At 106, as part of feature drift analysis, before applying the predictive model, the data quality accuracy is verified to ensure the model applicability to the data at hand. For this, Wasserstein distance or Jensen-Shannon metrics, for example, can be used to avoid incompatible datasets. At 108, a check is made whether the features are compatible. At 110, if the features are not compatible, a notification is provided. Otherwise, processing continues at step 112.

Data Preparation

At 112, data preparation is performed that involves the steps required to score the predictive model, such as checking/repairing consistent feature names, and applying data scaling as needed.

Model Scoring

At 114, model scoring occurs, including the process of applying an algorithmic model on some data to get the predictive insight that can be used to drive decision making.

Analytical Insight Transformation

At 116, analytical insights can be transformed to be displayed as color-coded flags on the layout with other drilling parameters. The data can also be reformatted and stored in a repository.

Prediction Outcome Visualization

At 118, the results of the previous step(s) are displayed in a special track that shows, for example, red flags for unfrackable zones and green flags indicating frackable zones.

Interactive Determination of Fracking Intervals

At 120, a user (such as a petroleum engineer) can define certain fracking intervals on the visual display as part of hydraulic fracture job planning. At 122, the probability of formation frackability can be calculated on-the-fly and displayed. The probability of frackability can be color-coded (or shaded) to assist quick decision making as shown in FIG. 2.

Figure 2:
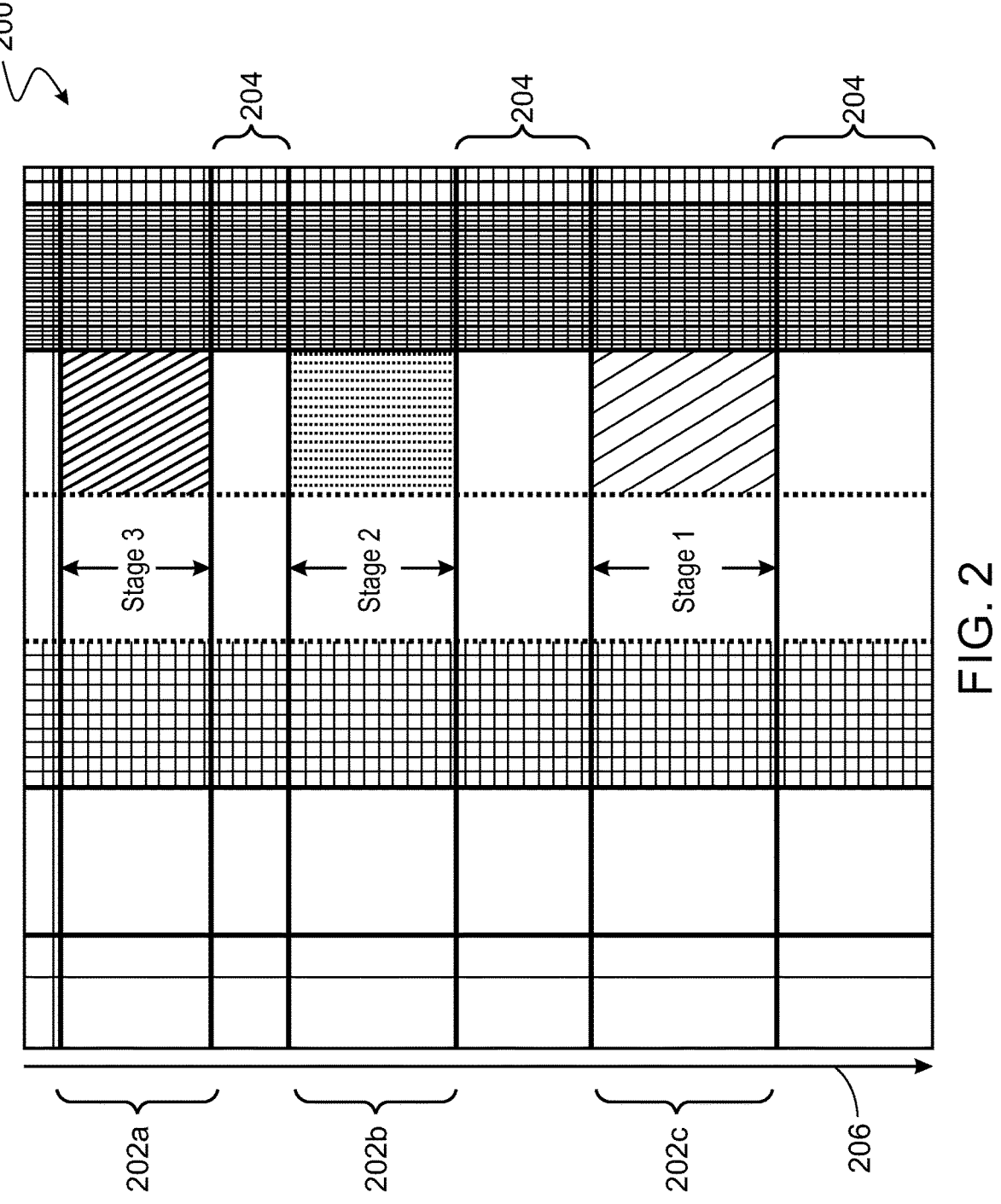
FIG. 2 is a depth chart showing example stages that are coded to indicate a probability of frackability in a track with other log tracks.

FIG. 2 is a depth chart 200 showing example stages 202a-202c that are coded to indicate a probability of frackability in a track with other log tracks. Although the stages 202-202c are shown with shading, color-coding can be used to indicate degrees of probability of frackability. The depth chart 200 can also show stages that have low probabilities of frackability, such as below a pre-determined frackability probability. Information in the depth chart 200 is presented relative to a depth axis 206.

In the development of the techniques of the present disclosure, data-driven predicative models were developed based on the analysis of surface logging data.

Algorithm

FIG. 3 is a flowchart of an example of a method 300 for determining frackability probabilities, according to some implementations of the present disclosure. For clarity of presentation, the description that follows generally describes method 300 in the context of the other figures in this description. However, it will be understood that method 300 can be performed, for example, by any suitable system, environment, software, and hardware, or a combination of systems, environments, software, and hardware, as appropriate. In some implementations, various steps of method 300 can be run in parallel, in combination, in loops, or in any order.

At 302, surface logging data of a well being drilled for fracking is accessed. For example, the surface logging data can include drilling parameters, mud logging data. From 302, method 300 proceeds to 304.

At 304, quality control (QC) and quality assurance (QA) are performed on the surface logging data. Performing QC and QA on the surface logging data can include checking data quality row-by-row and column-by-column, filtering out rows with one or both of missing and inconsistent values, and profiling data against measured depths to show missing values. From 304, method 300 proceeds to 306.

At 306, drift analysis is performed on the surface logging data. As an example, performing drift analysis on the surface logging data can include applying metrics to avoid incompatible datasets. From 306, method 300 proceeds to 308.

At 308, the surface logging data is prepared for predictive model processing. The data can be prepared, for example, as described with reference to step 112 of FIG. 2. From 308, method 300 proceeds to 310.

At 310, a predictive model is executed using the prepared surface logging data. The model can be executed, for example, as described with reference to step 114 of FIG. 2. From 310, method 300 proceeds to 312.

At 312, a visualization is generated based on executing the predictive model, including information provided for different drilling depths. The visualization can include one or more of the charts and graphs of FIGS. 2-4, for example. From 312, method 300 proceeds to 314.

At 314, fracking intervals are interactively determined using user inputs in the visualization. For example, the intervals 202a-202c can be determined. From 314, method 300 proceeds to 316.

At 316, frackability probabilities are determined for the fracking intervals, and updating the visualization to include a visualization of the fracking intervals. For example, the stages in FIG. 2 can be determined. Updating the visualization to include a visualization of the fracking intervals can include color-coding intervals for different ranges of frackability. After 316, method 300 can stop.

In some implementations, in addition to (or in combination with) any previously-described features, techniques of the present disclosure can include the following. Outputs of the techniques of the present disclosure can be performed before, during, or in combination with wellbore operations, such as to provide inputs to change the settings or parameters of equipment used for drilling. Examples of wellbore operations include forming/drilling a wellbore, hydraulic fracturing, and producing through the wellbore, to name a few. The wellbore operations can be triggered or controlled, for example, by outputs of the methods of the present disclosure. In some implementations, customized user interfaces can present intermediate or final results of the above described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or "app"), or at a central processing facility. The presented information can include suggestions, such as suggested changes in parameters or processing inputs, that the user can select to implement improvements in a production environment, such as in the exploration, production, and/or testing of petrochemical processes or facilities. For example, the suggestions can include parameters that, when selected by the user, can cause a change to, or an improvement in overall production of a gas or oil well. The suggestions, when implemented by the user, can improve the speed and accuracy of calculations, streamline processes, improve models, and solve problems related to efficiency, performance, safety, reliability, costs, downtime, and the need for human interaction. In some implementations, the suggestions can be implemented in real-time, such as to provide an immediate or near-immediate change in operations or in a model. The term real-time can correspond, for example, to events that occur within a specified period of time, such as within one minute or within one second. Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to the settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

The techniques of the present disclosure can have many commercial applications. The techniques can be used to solve the general problem of predicting the formation frackability utilizing surface logging data. The techniques can be used during well drilling as a stimulation planning while drilling (SWD) solution. In real-time, the techniques can be used to monitor the streamed data of ongoing drilling operations and mud logging to assess and advise about the well frackability as part of well geo-steering. Moreover, the techniques can be used after drilling to show the frackable zones in association with conventional and advanced well logs.

FIG. 4 is a block diagram of an example computer system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 430. In some implementations, one or more components of the computer 402 can be configured to operate within different environments, including cloud-computing-based environments, local environments, global environments, and combinations of environments.

At a top level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 630 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 403. In some implementations, any or all of the components of the computer 402, including hardware or software components, can interface with each other or the interface 404 (or a combination of both) over the system bus 403. Interfaces can use an application programming interface (API) 412, a service layer 413, or a combination of the API 412 and service layer 413. The API 412 can include specifications for routines, data structures, and object classes. The API 412 can be either computer-language independent or dependent. The API 412 can refer to a complete interface, a single function, or a set of APIs.

The service layer 413 can provide software services to the computer 402 and other components (whether illustrated or not) that are communicably coupled to the computer 402. The functionality of the computer 402 can be accessible for all service consumers using this service layer. Software services, such as those provided by the service layer 413, can provide reusable, defined functionalities through a defined interface. For example, the interface can be software written in JAVA, C++, or a language providing data in extensible markup language (XML) format. While illustrated as an integrated component of the computer 402, in alternative implementations, the API 412 or the service layer 413 can be stand-alone components in relation to other components of the computer 402 and other components communicably coupled to the computer 402. Moreover, any or all parts of the API 412 or the service layer 413 can be implemented as child or sub-modules of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402 and the described functionality. The interface 404 can be used by the computer 402 for communicating with other systems that are connected to the network 630 (whether illustrated or not) in a distributed environment. Generally, the interface 404 can include, or be implemented using, logic encoded in software or hardware (or a combination of software and hardware) operable to communicate with the network 630. More specifically, the interface 404 can include software supporting one or more communication protocols associated with communications. As such, the network 630 or the interface's hardware can be operable to communicate physical signals within and outside of the illustrated computer 402.

The computer 402 includes a processor 405. Although illustrated as a single processor 405 in FIG. 4, two or more processors 405 can be used according to particular needs, desires, or particular implementations of the computer 402 and the described functionality. Generally, the processor 405 can execute instructions and can manipulate data to perform the operations of the computer 402, including operations using algorithms, methods, functions, processes, flows, and procedures as described in the present disclosure.

The computer 402 also includes a database 406 that can hold data for the computer 402 and other components connected to the network 630 (whether illustrated or not). For example, database 406 can be an in-memory, conventional, or a database storing data consistent with the present disclosure. In some implementations, database 406 can be a combination of two or more different database types (for example, hybrid in-memory and conventional databases) according to particular needs, desires, or particular implementations of the computer 402 and the described functionality. Although illustrated as a single database 406 in FIG. 4, two or more databases (of the same, different, or combination of types) can be used according to particular needs, desires, or particular implementations of the computer 402 and the described functionality. While database 406 is illustrated as an internal component of the computer 402, in alternative implementations, database 406 can be external to the computer 402.

The computer 402 also includes a memory 407 that can hold data for the computer 402 or a combination of components connected to the network 630 (whether illustrated or not). Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same, different, or combination of types) can be used according to particular needs, desires, or particular implementations of the computer 402 and the described functionality.

While memory 407 is illustrated as an internal component of the computer 402, in alternative implementations, memory 407 can be external to the computer 402.

The application 408 can be an algorithmic software engine providing functionality according to particular needs, desires, or particular implementations of the computer 402 and the described functionality. For example, application 408 can serve as one or more components, modules, or applications. Further, although illustrated as a single application 408, the application 408 can be implemented as multiple applications 408 on the computer 402. In addition, although illustrated as internal to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion and management circuits, including recharging, standby, and power management functionalities. In some implementations, the power supply 414 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 630. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Described implementations of the subject matter can include one or more features, alone or in combination.

For example, in a first implementation, a computer-implemented method includes the following. Surface logging data of a well being drilled for fracking is accessed. Quality control (QC) and quality assurance (QA) are performed on the surface logging data. Drift analysis is performed on the surface logging data. The surface logging data is prepared for predictive model processing. A predictive model is executed using the prepared surface logging data. A visualization is generated based on executing the predictive model, including information provided for different drilling depths. Fracking intervals are interactively determined using user inputs in the visualization. Frackability probabilities are determined for the fracking intervals and updating the visualization to include a visualization of the fracking intervals.

The foregoing and other described implementations can each, optionally, include one or more of the following features:

A first feature, combinable with any of the following features, where the surface logging data includes drilling parameters, mud log lithology, and chromatography gas analysis data.

A second feature, combinable with any of the previous or following features, where performing QC and QA on the surface logging data includes checking data quality row-by-row and column-by-column, filtering out rows with one or both of missing and inconsistent values, and profiling data against measured depths to show missing values.

A third feature, combinable with any of the previous or following features, where performing drift analysis on the surface logging data includes applying Wasserstein distance and Jensen-Shannon metrics to avoid incompatible datasets.

A fourth feature, combinable with any of the previous or following features, where updating the visualization to include a visualization of the fracking intervals includes color-coding intervals for different ranges of frackability.

A fifth feature, combinable with any of the previous or following features, where the method further includes generating plots of predicative model accuracies based on blind testing of randomly selected data.

A sixth feature, combinable with any of the previous or following features, where the plots display model accuracy as a function of a number of resampling iterations in which a random dataset sample serves as a blind data set to evaluate the model accuracy.

In a second implementation, a non-transitory, computer-readable medium stores one or more instructions executable by a computer system to perform operations including the following. Surface logging data of a well being drilled for fracking is accessed. Quality control (QC) and quality assurance (QA) are performed on the surface logging data. Drift analysis is performed on the surface logging data. The surface logging data is prepared for predictive model processing. A predictive model is executed using the prepared surface logging data. A visualization is generated based on executing the predictive model, including information provided for different drilling depths. Fracking intervals are interactively determined using user inputs in the visualization. Frackability probabilities are determined for the fracking intervals and updating the visualization to include a visualization of the fracking intervals.

The foregoing and other described implementations can each, optionally, include one or more of the following features:

A first feature, combinable with any of the following features, where the surface logging data includes drilling parameters, mud log lithology, and chromatography gas analysis data.

A second feature, combinable with any of the previous or following features, where performing QC and QA on the surface logging data includes checking data quality row-by-row and column-by-column, filtering out rows with one or both of missing and inconsistent values, and profiling data against measured depths to show missing values.

A third feature, combinable with any of the previous or following features, where performing drift analysis on the surface logging data includes applying Wasserstein distance and Jensen-Shannon metrics to avoid incompatible datasets.

A fourth feature, combinable with any of the previous or following features, where updating the visualization to include a visualization of the fracking intervals includes color-coding intervals for different ranges of frackability.

A fifth feature, combinable with any of the previous or following features, where the operations further include generating plots of predicative model accuracies based on blind testing of randomly selected data.

A sixth feature, combinable with any of the previous or following features, where the plots display model accuracy as a function of a number of resampling iterations in which a random dataset sample serves as a blind data set to evaluate the model accuracy.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. Surface logging data of a well being drilled for fracking is accessed. Quality control (QC) and quality assurance (QA) are performed on the surface logging data. Drift analysis is performed on the surface logging data. The surface logging data is prepared for predictive model processing. A predictive model is executed using the prepared surface logging data. A visualization is generated based on executing the predictive model, including information provided for different drilling depths. Fracking intervals are interactively determined using user inputs in the visualization. Frackability probabilities are determined for the fracking intervals and updating the visualization to include a visualization of the fracking intervals.

The foregoing and other described implementations can each, optionally, include one or more of the following features:

A first feature, combinable with any of the following features, where the surface logging data includes drilling parameters, mud log lithology, and chromatography gas analysis data.

A second feature, combinable with any of the previous or following features, where performing QC and QA on the surface logging data includes checking data quality row-by-row and column-by-column, filtering out rows with one or both of missing and inconsistent values, and profiling data against measured depths to show missing values.

A third feature, combinable with any of the previous or following features, where performing drift analysis on the surface logging data includes applying Wasserstein distance and Jensen-Shannon metrics to avoid incompatible datasets.

A fourth feature, combinable with any of the previous or following features, where updating the visualization to include a visualization of the fracking intervals includes color-coding intervals for different ranges of frackability.

A fifth feature, combinable with any of the previous or following features, where the operations further include generating plots of predicative model accuracies based on blind testing of randomly selected data.

A sixth feature, combinable with any of the previous or following features, where the plots display model accuracy as a function of a number of resampling iterations in which a random dataset sample serves as a blind data set to evaluate the model accuracy.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at the application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
accessing surface logging data of a well being drilled for fracking, the surface logging data being converted into a table comprising rows and columns;
performing quality control (QC) and quality assurance (QA) on the surface logging data;
performing drift analysis on the surface logging data to ensure probability distribution of the surface logging data to be within a predetermined value;
verifying a terminology consistency across the rows and columns of the table to identify inconsistent values associated with drilling parameters and mud logs;
filtering the inconsistent values from the table to generate prepared surface logging data;
generating, based on processing the prepared surface logging data using a predictive model, a visualization formatted as a depth chart and comprising information provided for different drilling depths displayed as a plurality of stages coded to indicate a probability of frackability in a track with other log tracks;
determining frackability probabilities for fracking intervals relative to the different drilling depths; and
updating wellbore operations to adjust settings of a downhole equipment according to the fracking intervals.

2. The computer-implemented method of claim 1, wherein the surface logging data comprises the drilling parameters, mud log lithology, and chromatography gas analysis data.

3. The computer-implemented method of claim 1, wherein filtering the inconsistent values comprises checking data quality row-by-row and column-by-column, filtering out rows with one or both of missing and inconsistent values, and profiling data against measured depths to show missing values.

4. The computer-implemented method of claim 1, wherein performing drift analysis on the surface logging data comprises applying Wasserstein distance and Jensen-Shannon metrics to avoid incompatible datasets.

5. The computer-implemented method of claim 1, wherein the visualization comprises color coded intervals for different ranges of frackability.

6. The computer-implemented method of claim 1, further comprising:
   generating plots of predicative model accuracies based on blind testing of randomly selected data.

7. The computer-implemented method of claim 6, wherein the plots display model accuracy as a function of a number of resampling iterations in which a random dataset sample serves as a blind data set to evaluate the model accuracy.

8. A non-transitory, computer-readable medium storing one or more instructions executable by a computer system to perform operations comprising:
   accessing surface logging data of a well being drilled for fracking, the surface logging data being converted into a table comprising rows and columns;
   performing quality control (QC) and quality assurance (QA) on the surface logging data;
   performing drift analysis on the surface logging data to ensure probability distribution of the surface logging data to be within a predetermined value;
   verifying a terminology consistency across the rows and columns of the table to identify inconsistent values associated with drilling parameters and mud logs;
   filtering the inconsistent values from the table to generate prepared surface logging data;
   generating, based on processing the prepared surface logging data using a predictive model, a visualization formatted as a depth chart and comprising information provided for different drilling depths displayed as a plurality of stages coded to indicate a probability of frackability in a track with other log tracks;
   determining frackability probabilities for fracking intervals relative to the different drilling depths; and
   updating wellbore operations to adjust settings of a downhole equipment according to the fracking intervals.

9. The non-transitory, computer-readable medium of claim 8, wherein the surface logging data comprises the drilling parameters, mud log lithology, and chromatography gas analysis data.

10. The non-transitory, computer-readable medium of claim 8, wherein filtering the inconsistent values comprises checking data quality row-by-row and column-by-column, filtering out rows with one or both of missing and inconsistent values, and profiling data against measured depths to show missing values.

11. The non-transitory, computer-readable medium of claim 8, wherein performing drift analysis on the surface logging data comprises applying Wasserstein distance and Jensen-Shannon metrics to avoid incompatible datasets.

12. The non-transitory, computer-readable medium of claim 8, wherein the visualization comprises color coded intervals for different ranges of frackability.

13. The non-transitory, computer-readable medium of claim 8, the operations further comprising:
   generating plots of predicative model accuracies based on blind testing of randomly selected data.

14. The non-transitory, computer-readable medium of claim 13, wherein the plots display model accuracy as a function of a number of resampling iterations in which a random dataset sample serves as a blind data set to evaluate the model accuracy.

15. A computer-implemented system, comprising:
   one or more processors; and
   a non-transitory computer-readable storage medium coupled to the one or more processors and storing programming instructions for execution by the one or more processors, the programming instructions instructing the one or more processors to perform operations comprising:
   accessing surface logging data of a well being drilled for fracking, the surface logging data being converted into a table comprising rows and columns;
   performing quality control (QC) and quality assurance (QA) on the surface logging data;
   performing drift analysis on the surface logging data to ensure probability distribution of the surface logging data to be within a predetermined value;
   verifying a terminology consistency across the rows and columns of the table to identify inconsistent values associated with drilling parameters and mud logs;
   filtering the inconsistent values from the table to generate prepared surface logging data;
   generating, based on processing the prepared surface logging data using a predictive model, a visualization formatted as a depth chart and comprising information provided for different drilling depths displayed as a plurality of stages coded to indicate a probability of frackability in a track with other log tracks;
   determining frackability probabilities for fracking intervals relative to the different drilling depths; and
   updating wellbore operations to adjust settings of a downhole equipment according to the fracking intervals.

16. The computer-implemented system of claim 15, wherein the surface logging data comprises the drilling parameters, mud log lithology, and chromatography gas analysis data.

17. The computer-implemented system of claim 15, wherein filtering the inconsistent values comprises checking data quality row-by-row and column-by-column, filtering out rows with one or both of missing and inconsistent values, and profiling data against measured depths to show missing values.

18. The computer-implemented system of claim 15, wherein performing drift analysis on the surface logging data comprises applying Wasserstein distance and Jensen-Shannon metrics to avoid incompatible datasets.

19. The computer-implemented system of claim 15, wherein the visualization comprises color coded intervals for different ranges of frackability.

20. The computer-implemented system of claim 15, the operations further comprising:

generating plots of predicative model accuracies based on blind testing of randomly selected data.

* * * * *